(12) United States Patent
Collison et al.

(10) Patent No.: US 7,627,828 B1
(45) Date of Patent: Dec. 1, 2009

(54) SYSTEMS AND METHODS FOR GRAPHICALLY REPRESENTING USERS OF A MESSAGING SYSTEM

(75) Inventors: Derek L. Collison, Foster City, CA (US); Vadim V. Spivak, San Francisco, CA (US); Keith H. Coleman, Mountain View, CA (US); David Chad Thornton, San Francisco, CA (US); Adam Ross Barker, Menlo Park, CA (US)

(73) Assignee: Google Inc, Mountain View, CA (US)

( * ) Notice: Subject to any disclaimer, the term of this patent is extended or adjusted under 35 U.S.C. 154(b) by 299 days.

(21) Appl. No.: 11/419,407

(22) Filed: May 19, 2006

Related U.S. Application Data

(60) Provisional application No. 60/791,958, filed on Apr. 12, 2006.

(51) Int. Cl.
*G06F 3/00* (2006.01)
*G06F 3/048* (2006.01)
*G06F 15/16* (2006.01)

(52) U.S. Cl. ............. 715/752; 715/751; 715/753; 715/758; 715/706; 715/861; 709/204; 709/206; 709/207

(58) Field of Classification Search ............ 715/571, 715/752, 753, 758, 706, 856, 861
See application file for complete search history.

(56) References Cited

U.S. PATENT DOCUMENTS

| | | | | |
|---|---|---|---|---|
| 7,406,501 | B2 * | 7/2008 | Szeto et al. | 709/206 |
| 2002/0120697 | A1 * | 8/2002 | Generous et al. | 709/206 |
| 2004/0054736 | A1 * | 3/2004 | Daniell et al. | 709/206 |
| 2004/0158611 | A1 * | 8/2004 | Daniell et al. | 709/206 |
| 2004/0172455 | A1 * | 9/2004 | Green et al. | 709/207 |
| 2004/0174392 | A1 * | 9/2004 | Bjoernsen et al. | 345/751 |
| 2004/0177122 | A1 * | 9/2004 | Appelman et al. | 709/206 |
| 2004/0179039 | A1 * | 9/2004 | Blattner et al. | 345/758 |
| 2004/0243941 | A1 * | 12/2004 | Fish | 715/752 |
| 2004/0267625 | A1 * | 12/2004 | Feng et al. | 705/26 |
| 2004/0268263 | A1 * | 12/2004 | Van Dok et al. | 715/733 |
| 2005/0021624 | A1 * | 1/2005 | Herf et al. | 709/204 |
| 2005/0102365 | A1 * | 5/2005 | Moore et al. | 709/207 |
| 2005/0166154 | A1 * | 7/2005 | Wilson et al. | 715/751 |
| 2005/0262186 | A1 * | 11/2005 | Szeto et al. | 709/203 |
| 2006/0053379 | A1 * | 3/2006 | Henderson et al. | 715/751 |
| 2006/0095976 | A1 * | 5/2006 | Torres et al. | 726/28 |
| 2006/0150109 | A1 * | 7/2006 | Schultz et al. | 715/759 |
| 2007/0005710 | A1 * | 1/2007 | Starbuck et al. | 709/206 |
| 2007/0067392 | A1 * | 3/2007 | Torres et al. | 709/206 |
| 2007/0143178 | A1 * | 6/2007 | Citrin et al. | 705/14 |

\* cited by examiner

*Primary Examiner*—Dennis-Doon Chow
*Assistant Examiner*—Linh K Pham
(74) *Attorney, Agent, or Firm*—Morgan, Lewis & Bockius LLP

(57) ABSTRACT

In a method of graphically representing users of an integrated email and instant messaging (IM) system, the system allows a second user to associate a graphical user identifier with a first user and suggests the graphical user identifier to the first user. The first user may accept or reject the graphical user identifier. If the first user accepts the graphical user identifier, the system displays the graphical user identifier to a third user when the third user accesses any email or IM message associated with the first user. The third user can override the graphical user identifier of the first user with a different graphical user identifier including a new one uploaded into the system by the third user.

25 Claims, 15 Drawing Sheets

SYSTEMS AND METHODS FOR GRAPHICALLY REPRESENTING USERS OF A MESSAGING SYSTEM

CROSS-REFERENCE TO RELATED APPLICATION

This application claims priority to U.S. Provisional Patent Application Ser. No. 60/791,958, filed Apr. 12, 2006, which is incorporated by referenced herein in its entirety.

FIELD OF THE INVENTION

The present invention relates generally to messaging systems, such as email and instant messaging systems, and in particular to systems and methods for graphically identifying or representing message participants.

BACKGROUND OF THE INVENTION

Email and instant messaging (IM) services are widely used for exchanging information over the Internet. When a user chooses one service provider over another, user-friendliness is undoubtedly an important consideration. For example, current messaging services use text (e.g., the names or email addresses of the senders and recipients) to represent the participants of an email or IM message. This is inconvenient when two participants share similar names (e.g., the same first name). In addition, it is sometimes difficult to infer a participant's identity from the participant's email address (e.g., when the email address does not include the participant's name). Therefore, there is a need for systems and methods that make it easier for message participants to identify the other participants in an exchange of messages.

SUMMARY

In a method of graphically representing users of an integrated email and instant messaging (IM) system, the system allows a second user to associate a graphical user identifier with a first user. Subsequently, when the second user accesses an email message or an IM message associated with the first user, the system displays the graphical user identifier to the second user. While the graphical user identifier can be a photograph, it can also be graphical image that is not a photograph.

In one aspect of the present invention, the system displays to the second user multiple graphical user identifiers of the first user when the second user edits contact information of the first user. The second user can replace the current graphical user identifier of the first user with one of the multiple graphical user identifiers or a graphical user identifier uploaded into the messaging system by the second user.

In another aspect of the present invention, the second user can send a message to the first user suggesting the newly uploaded graphical user identifier. The first user can accept or reject the graphical user identifier. If the first user accepts the graphical user identifier, the messaging system displays the graphical user identifier to a third user when the third user accesses an email or IM message associated with the first user.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

FIG. 10 is an exemplary user interface screenshot of the second user sending a message suggesting the graphical user identifier to the first user in accordance with some embodiments of the present invention.

FIG. 11 is an exemplary user interface screenshot of the first user receiving the message suggesting the graphical user identifier in accordance with some embodiments of the present invention.

Like reference numerals refer to corresponding parts throughout the several views of the drawings.

DESCRIPTION OF EMBODIMENTS

Figure 1:
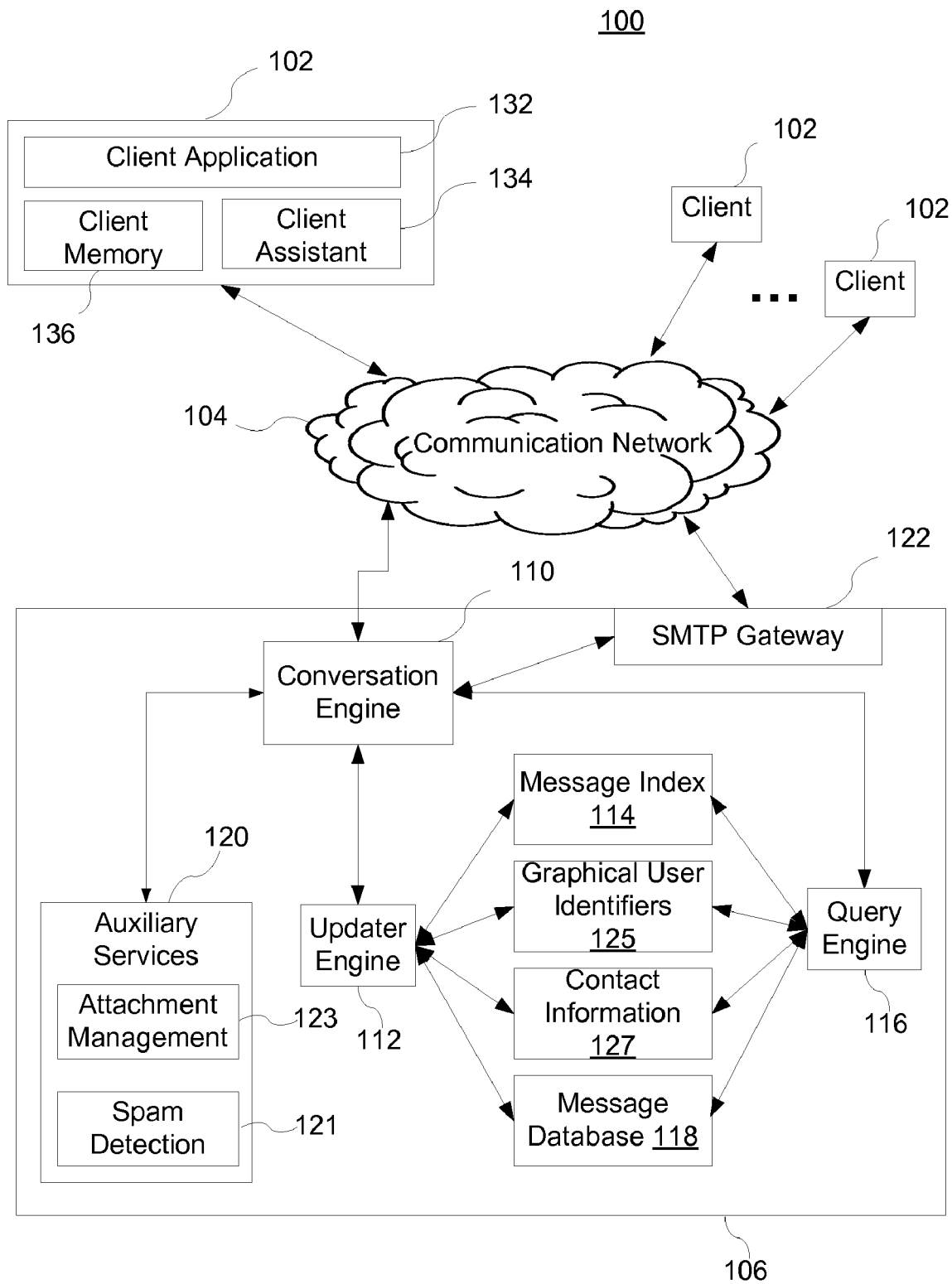
FIG. 1 is a block diagram of an exemplary environment that represents users of an information service using graphical user identifiers in accordance with some embodiments of the present invention.

FIG. 1 is a block diagram of a system 100 for implementing some embodiments of the present invention. One or more clients 102 can be connected to a communication network 104. The communication network 104 can be connected to an information service 106. In some embodiments, the information service 106 comprises an integrated email and IM service that enables a large number of users to exchange information through email and IM messages. The information service 106 can include a conversation engine 110, an updater engine 112, a message index 114, a query engine 116, a message database 118, a graphical user identifiers database 125, a contact information database 127, one or more auxiliary services 120, and an SMTP gateway 122.

The client 102 can be any of a number of devices (e.g., a computer, an internet kiosk, a personal digital assistant, a cell phone, a gaming device, a desktop computer, or a laptop computer) and can include a client application 132, a client assistant 134, and/or client memory 136. The client application 132 can be a software application that permits a user to interact with the client 102 and/or network resources to perform one or more tasks. For example, the client application 132 can be a browser (e.g., Firefox) or other type of application that permits a user to search for, browse, and/or use resources (e.g., web pages and web services) on the client 102 and/or accessible via the communication network 104. The client assistant 134 can perform one or more tasks related to monitoring a user's activities with respect to the client application 132 and/or other applications, searching or browsing for resources (e.g., files) on the client 102, and processing information received from or being sent to the information service 106. The client assistant 134 can be part of the client application 132, available as a plug-in to the client application 132 (provided, for example, from various on-line sources), or provided as a stand-alone program. The client assistant can be a web-based messaging application such as the client executable portion of the Google Gmail product. Client memory 136 can store system information and information about a user, among other things.

The communication network 104 can be any local area network (LAN) and/or wide area network (WAN), such as an intranet, an extranet, or the Internet. It is sufficient that the communication network 104 provides communication capability between the clients 102 and the information service 106. In some embodiments, the communication network 104 uses the HyperText Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any piece of information or service that is accessible via a Uniform Resource Locator (URL) and can be, for example, a web page, a document, an email message, an Instant Messaging (IM) message, a Short Message Service (SMS) message, a transcribed voice message, a database, an image, or a computational object.

The conversation engine 110 can respond to a variety of requests from the client assistant 134 related to messages and return conversation-based responses via its connection with the communication network 104. A conversation may include one or more relevant messages relating to a conversation topic. Various criteria can be used to determine which messages belong to each distinct conversation. For example, an analysis can be made of the contents of messages received and/or sent by a user. Messages whose contents are found to be related can be grouped together. In another example, a thread identifier found in a message header can also be used to identify related messages. In a further example, a subject line in the message header can be used to identify related messages. The senders and recipients of the messages are participants in the conversation. All messages directed to a user of the information service 106 can be grouped into a plurality of conversations and presented to the user in a conversation-based format, individually or jointly. In a conversation list view, a user can see in a summary form a list of conversations in which the user participates. In a conversation view, the user can see in an expanded form one or more of messages associated with a particular conversation.

In some embodiments, the information service 106 creates a snippet of a conversation or a message. A snippet provides a user with a preview of the contents of the conversation or message without the user having to open the conversation or the message. In a list of conversations, the snippet can be generated from the most recent message in the conversation. The snippet can also be extracted from the first message (i.e., the oldest message) in the conversation. The snippet can also be extracted from all the messages in the conversation according to predefined heuristic rules, e.g., listing a set of keywords appearing most frequently in the conversation. If the information service 106 is preparing a list of conversations in response to a search submitted by a user, the information service 106 can create a snippet for each conversation in the list, or for each conversation is a displayed portion of the list, the snippet including a portion of the conversation that matches user-submitted query terms. These snippets may be similar in one or more respects to snippets included in search results returned by a search engine, such as the Google search engine. In a conversation view, a snippet can be generated for one or more messages in the conversation.

The SMTP gateway 122 is also connected to the communication network 104. The SMTP gateway 122 can be directly involved in receiving and sending messages between the information service 106 and other email systems, messaging systems or information services. In some embodiments, the SMTP gateway 122, for example, transmits and receives messages using the simple mail transfer protocol (SMTP). The SMTP gateway 122 can receive a new message from the communication network 104 and send the message to conversation engine 110 for additional processing. Additionally, the SMTP gateway 122 can receive messages from the conversation engine 110 and then transmit (via the communication network 104) those messages to recipient addresses specified in the messages.

The one or more auxiliary services 120 can provide additional services to the conversation engine 110. In some embodiments, the auxiliary services 120 include a spam detection module 121 for detecting and processing spam and an attachment management module 123 for managing the storage and retrieval of documents attached to messages.

Below is a general description of the operation of the information service 106. Upon receipt of a new message directed to a recipient who has an account at the information service 106, the conversation engine 110 first pre-processes the message by, e.g., invoking the spam detection module 121 to check if the message is spam and the attachment management module 123 to separate the message's attachments, if any, from the message itself. The pre-processed message is then submitted to the updater engine 112.

The updater engine 112 then performs further operations on the message. For example, the updater engine 112 generates index entries for the message and stores the index entries in the message index 114. The message itself is stored in the message database 118. In addition, the updater engine 112 determines whether the sender of the message has a new graphical user identifier (e.g., the sender's image), and if so, stores the new graphical user identifier in the graphical user identifier database 125. More detailed information about the operation of the information service 106 with respect to graphic user identifiers is provided below in connection with FIGS. 7-16.

Subsequently, when the recipient logs into his or her account from a client 102, the conversation engine 110 submits a request to the query engine 116 soliciting messages directed to the recipient. The query engine 116 accordingly queries the message index 114, the graphical user identifiers database 125, the contact information database 127, and the message database 118 to collect relevant information. Next, the query engine 116 prepares a response using the collected information and transmits the response to the requesting client through the conversation engine 110 and/or the SMTP Gateway 122.

If the recipient merely logs into his or her account without specifying any particular message, the response comprises a list of conversations in which the recipient is a participant. If the recipient submits a request for a specific message (e.g., the previous message directed to the recipient), the conversation engine 110 forwards the request to the query engine 116. The query engine 116 extracts the message from the message database 118 and associated graphical user identifiers from the graphical user identifier 125, each corresponding to a respective participant of the message. The query engine 116 then transmits a new response to the requesting client 102. The new response includes the requested message and the associated graphical user identifiers.

In some embodiments, the online service 106 or conversation engine 110 does not require users to have graphical user identifiers. Furthermore, some users may choose to limit the users who can view their graphical user identifiers. For these, and possibly other reasons as well, some, or even all of the participants in a particular message may not have associated graphical user identifiers, while for other messages all the participants may have associated graphical user identifiers.

In some embodiments, the conversation engine 110 manages multiple on-line chat rooms at the same time. Each chat room includes at least two participants and the participants chat with each other by exchanging IM messages. Initially, the conversation engine 110 receives a request to establish a chat room between the two participants. In response, the conversation engine 110 retrieves the graphical user identifiers of the two users from the graphical user identifiers database 125. Next, the conversation engine 110 sends a notification to each participating client 102, instructing the respective client application 132 and client assistant 134 to open a window for a participant to enter IM messages through the client application 132. The window includes every participant's identity information such as his or her name (or screen name) and graphical user identifier.

FIG. 1 is exemplary. In some embodiments, the information service 106 contains a subset or superset of those elements illustrated in the figure. Although FIG. 1 shows the information service 106 as a number of discrete elements, this figure is intended more as a functional description of the various features which may be present in the information service 106 than as a structural schematic of the various embodiments. In practice, and as recognized by those of ordinary skill in the art, some elements shown separately could be combined and some elements could be further divided into sub-elements or parallel elements. For example, some separate elements in the figure could be implemented by a single server or module and some single elements could be implemented by one or more servers or modules. The actual number of servers in information service 106 and how features are allocated among the servers will vary from one implementation to another, and may depend in part on the amount of traffic that the system must handle during peak usage periods as well as during average usage periods. For example, the message database 118 can be implemented using a plurality of servers if the information service 106 manages a large volume of messages associated with a large number of user accounts.

As mentioned above, the client 102 can include client application 132 and client assistant 134. Client application 132 can provide a window to be displayed on a displaying device (e.g., a monitor) for rendering conversations and IM-based chat rooms associated with a particular user. The conversations, the chat rooms and their associated messages can be encoded using HyperText Markup Language (HTML), XML, or any other appropriate markup language or encoding scheme, and then rendered by the client application 132. When a user submits a request through client application 132 to the information service 106 to access messages stored in the user's account, the information service 106 identifies conversations in the user's account in accordance with the user's request and transfers them as well as a set of display instructions back to the client 102. Client assistant 134 can, in response, generate one or more forms in accordance with the display instructions, where each form can include information of some of the conversations. The forms can then be submitted to and rendered by client application 132. In another embodiment, client assistant 134 may alternatively exist and operate in the information service 106.

The information service 106 and the client assistant 134 work in concert to allow a user to view, compose, send and/or search messages in the user's account and to present the search results in a highly intuitive fashion. The information service 106 extracts information from a user's account by processing messages received, sent and/or being composed by the user, and the client assistant 134 assists in rendering the information prepared by the information service 106. In other embodiments a different division of duties between the information service 106 and the client assistant 134 can be implemented. Because many of the tasks performed by the system can be performed by either the information service 106 or the client assistant 134 or by the two working together, these two components are sometimes herein referred to jointly as the "conversation system".

The conversation system can provide at least two different views, including a conversation list view and a conversation view as mentioned briefly above. In a conversation list view, a plurality of conversations can be displayed where each conversation can be displayed in a summary form. For example, each conversation can be represented by a number of conversation elements. The conversation elements can include one or more of: a number indicating the number of messages in the conversation, a list of one or more of textual identifiers or names of the participants of the conversation, a conversation description (e.g., a subject line of the message), a date/time value of the conversation (e.g., a date/time value of the last received message in the conversation), and a snippet from one or more of the messages in the conversation. A participant of the conversation may have an associated graphical user identifier. In some embodiments, the client application 132 displays the graphical user identifier in a small pop-up window when a user moves his or her mouse cursor over the participant's name. In some other embodiments, the graphical user identifier is displayed next to the participant's name in the conversation list view. In one approach, each conversation can be represented as a single row in the conversation list view.

In a conversation view, one or more messages from a conversation can be displayed. Each message can be displayed in one of a number of various modes, for example an expanded mode, a compacted mode, or a compressed mode. In an expanded mode, the body of the message can be displayed along with, for example, header information including names or other identifiers of the sender and the recipients of the message, a date/time value indicative of when the message is received or sent, routing information, and other properties of the message. In some embodiments, the client application 132 pops up a small window displaying a graphical user identifier associated with any sender or recipient when a user moves his or her mouse cursor over the name of the sender or recipient. An expanded mode can be used, for example, for messages which are marked as "unread." In a compacted mode, the message body can be hidden and a snippet from the message is provided in its place. The snippet can be chosen to occupy less space than the body. For example, a snippet can be chosen to occupy only one line in a display window. The compacted mode can be used for messages which have been read or marked as read. The compacted mode allows messages in a conversation to be displayed within the same window more densely than if the expanded mode were used. In a compressed mode, a message can be represented with a small bar. The small bar can contain no message information. The visual effect of such a mode can be that multiple compressed messages appear like the edges of cards in a deck of cards. A user can toggle between the various display modes by selecting a message or using various controls in the display window. It should be understood that the techniques described in this specification with reference to a conversation (as might be found in the Google Gmail product) can be equally used with any message system (e.g., Outlook or Thunderbird) where messages can be displayed in various views (and can include portions of messages) such as a message view or a thread view where related messages can be displayed.

In some embodiments, when a conversation is being displayed in the conversation view, additional, targeted information can be displayed in the display window. For example, one or more advertisements relevant to, or related to, one or more of the messages in the conversation can be displayed. In another example, one or more other types of information can be displayed. Such other information can include, but is not limited to news items or links to news items, map links, phone numbers, links to product information, stock prices or links to stock prices, links to weather forecasts, web page links, dictionary entries or links to dictionary entries, images or links to images, RSS feeds or links to RSS feeds, links to blog (web log) events, links to user polls, links to files or other content on the client 102, and other types of information.

Figure 2:
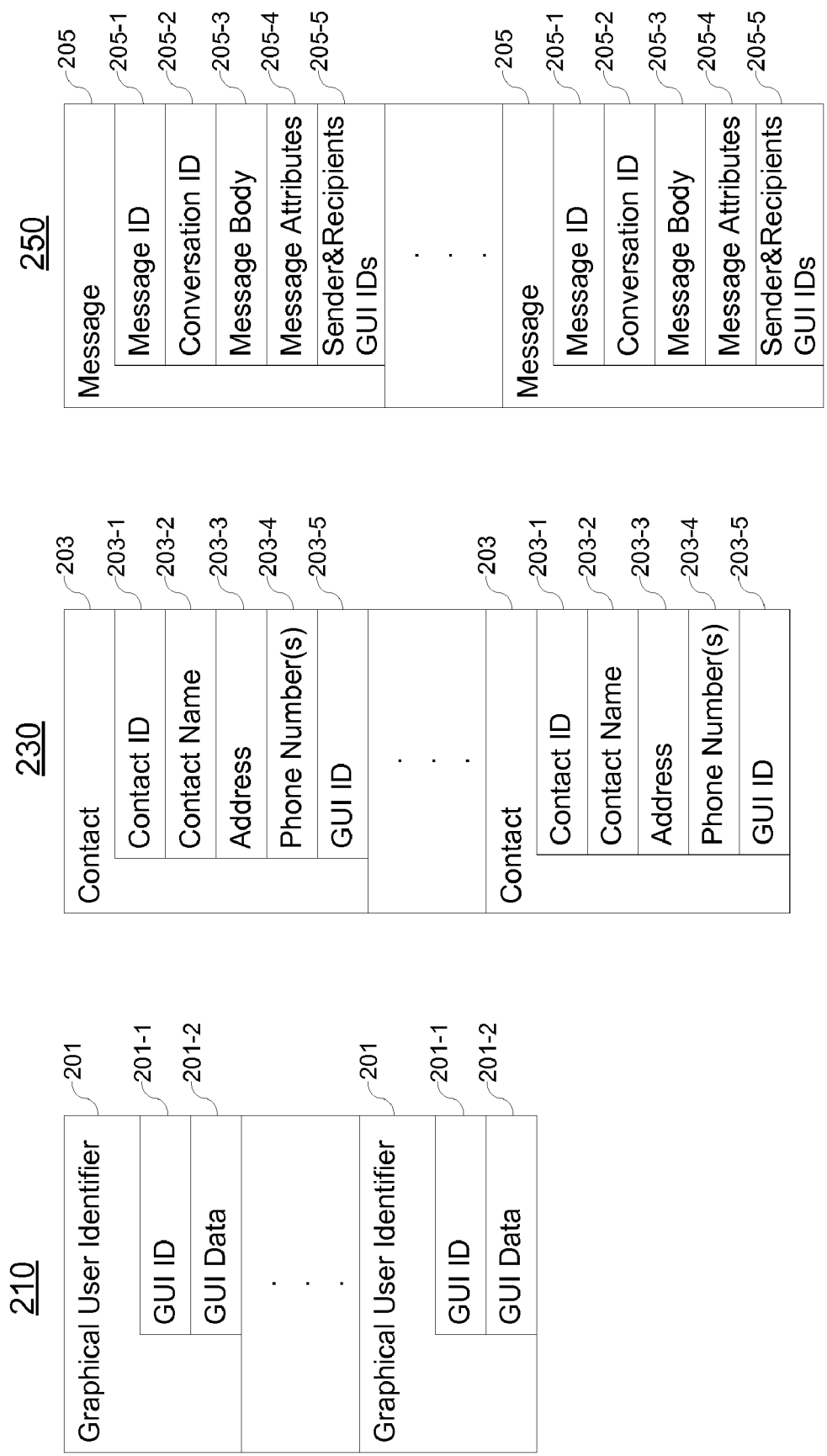
FIG. 2 is a block diagram of data structures used by the information service in accordance with some embodiments of the present invention.

FIG. 2 is a block diagram of data structures used by the information service 106 in accordance with some embodiments of the present invention. Each user is associated with a plurality of data entries in the information service 106. For example, the user may be the sender or recipient of multiple messages in the message database 118. The user may have a list of contacts with whom the user has communicated previously. The corresponding contact information is stored in the contact information database 127. One attribute of a contact's personal information is a graphical user identifier. This graphical user identifier may be associated with the contact by the user (i.e., by the user of the account that includes the contact) or by the contact, as will be explained in more detail below. All the graphical user identifiers are stored in the graphical user identifiers database 125.

Data structure 210 stores data in the graphical user identifiers database 125. Each graphical user identifier 201 has at least two attributes, a graphical user identifier (GUI) ID 201-1 and GUI data 201-2. As noted below, the GUI ID 201-1 is used by the other data structures 230 and 250 to uniquely identify the graphical user identifier 201 in the database 125. The GUI data 201-2 may be an image, such as a user's picture or a drawing. In some embodiments, the GUI data 201-2 for one or more users may comprise a video stream, a sequence of images, or other set of images. The size of the image or other GUI data is preferably small so as to reduce the overhead of transmitting messages including the graphical user identifiers between the clients 102 and the information service 106.

Data structure 230 stores information for a set of contacts 203 (also called contact records) associated with a particular user (e.g., the contacts listed in the user's contact list or address book). Each contact 203 has associated attributes, examples of which include a contact ID 203-1, a contact name 203-2, an address 203-3, phone numbers 203-4 and a GUI ID 203-5. The GUI ID 203-5 points to a particular graphical user identifier in the data structure 210. When the user accesses the contact's personal information from a client 102, the graphical user identifier identified by the GUI ID 203-5 is displayed together with the other attributes in the client application 132. In some embodiments, a contact can include a plurality of GUI IDs 203; for example, a contact may include a GUI ID of graphical user identifier selected by the contact and another GUI ID of a graphical user identifier selected by the user who "owns" the contact list.

Data structure 250 stores messages, which may be associated with multiple users of the information service. As noted above, in some embodiments, these messages are grouped into different conversations. For each message 205, there is a unique message ID 205-1, a conversation ID 205-2, a message body 205-3, message attributes 205-4, and one or more GUI IDs of the sender and recipient(s) of the message. For example, when the query engine 116 receives a request including a particular conversation ID, the query engine 116 identifies all messages having the same conversation ID. For each identified message, the query engine 116 retrieves the graphical user identifiers according to the GUI IDs from the graphical user identifiers database 125. A response including the messages, the graphical user identifiers as well as the display instructions is sent back to the requesting client.

It will be apparent to one skilled in the art that the data structures in the figure are intended to highlight the use of graphical user identifiers in the information service 106. There are many other equivalent data structures known in the art that can be adopted to support similar functionalities. Some of the attributes shown in the figure may not be necessary or can be combined with others. Some data attributes are skipped from the data structures in the figure for illustrative reasons.

Figure 3:
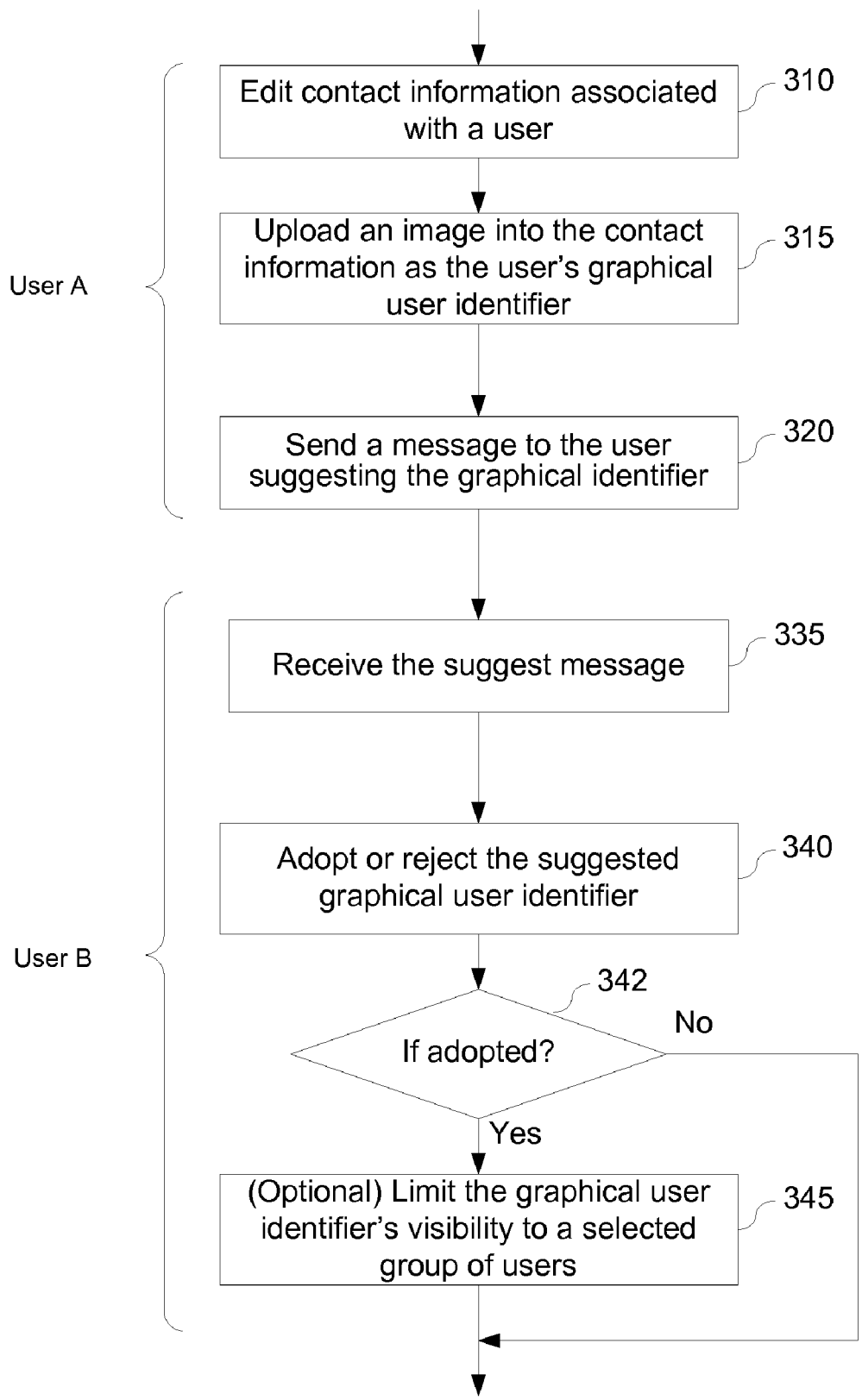
FIG. 3 is a flow diagram of a process of one user suggesting a graphical user identifier to another user and the other user adopting or rejecting the graphical user identifier in accordance with some embodiments of the present invention.

FIG. 3 is a flow diagram of a process of one user suggesting a graphical user identifier to another user and the other user adopting or rejecting the graphical user identifier in accordance with some embodiments of the present invention. Initially, before making any suggestion, user A first edits user B's contact information (310). In this context, user B's contact information is logically located in user A's contact list. As noted above, one attribute of user B's contact information is a GUI ID pointing to a graphical user identifier. In some embodiments, user B may not have an existing graphical user identifier and the attribute GUI ID is a null value. In either case, user A can select his or her favorite image for user B by uploading a new image into user B's contact information (315). Therefore, a user can not only choose a graphical user identifier for himself or herself, but also can select one for another user. This feature enables the user to further personalize the identifiers of the other users with whom he or she communicates. In addition, this feature can be used to disambiguate or distinguish between users who have selected similar or identical graphical user identifiers.

In addition, user A can send a message to user B, suggesting the graphical user identifier he or she has picked to user B (320). After receiving the message (335), user B has two choices, adopting the suggested graphical user identifier or rejecting it (340). For example, user B may flatly reject it if another user with whom he or she communicates already uses the same or similar identifier or if he or she still favors the current one used by user B. As an optional step, user B may prefer to limit the new graphical user identifier's visibility to a selected group of users chosen by user B (345). For instance, user B may specify that only users with whom user B chats can see the new graphical user identifier in their respective IM service window. Alternatively, user B can make the image only visible to a group of users selected by user B from user B's contact list. In some embodiments, a user may even have multiple graphical user identifiers, e.g., one for business and another for private purposes.

In yet another alternative, instead of (or in addition to) users sending messages to suggest graphical user identifiers to each other, a user (e.g., "user A") may be presented (e.g., in an account settings form or GUI) with both user A's current graphical user identifier and the graphical user identifiers that others (other users) have set for user A. Thus, if N of user A's contacts have selected alternate graphical user identifiers for user A, user A can view those alternate graphical user identifiers in a GUI and can select any one of those graphical user identifiers has his or her default graphical user identifier.

Generally speaking, the graphical user identifier a first user selects for himself or herself is the user's default graphical user identifier. The first user uses this default graphical user identifier to communicate with others. A second user receiving a message including this default graphical user identifier has two options. First, he or she can adopt this default graphical user identifier. Second, he or she can replace it with his or her own choice.

Figure 4:
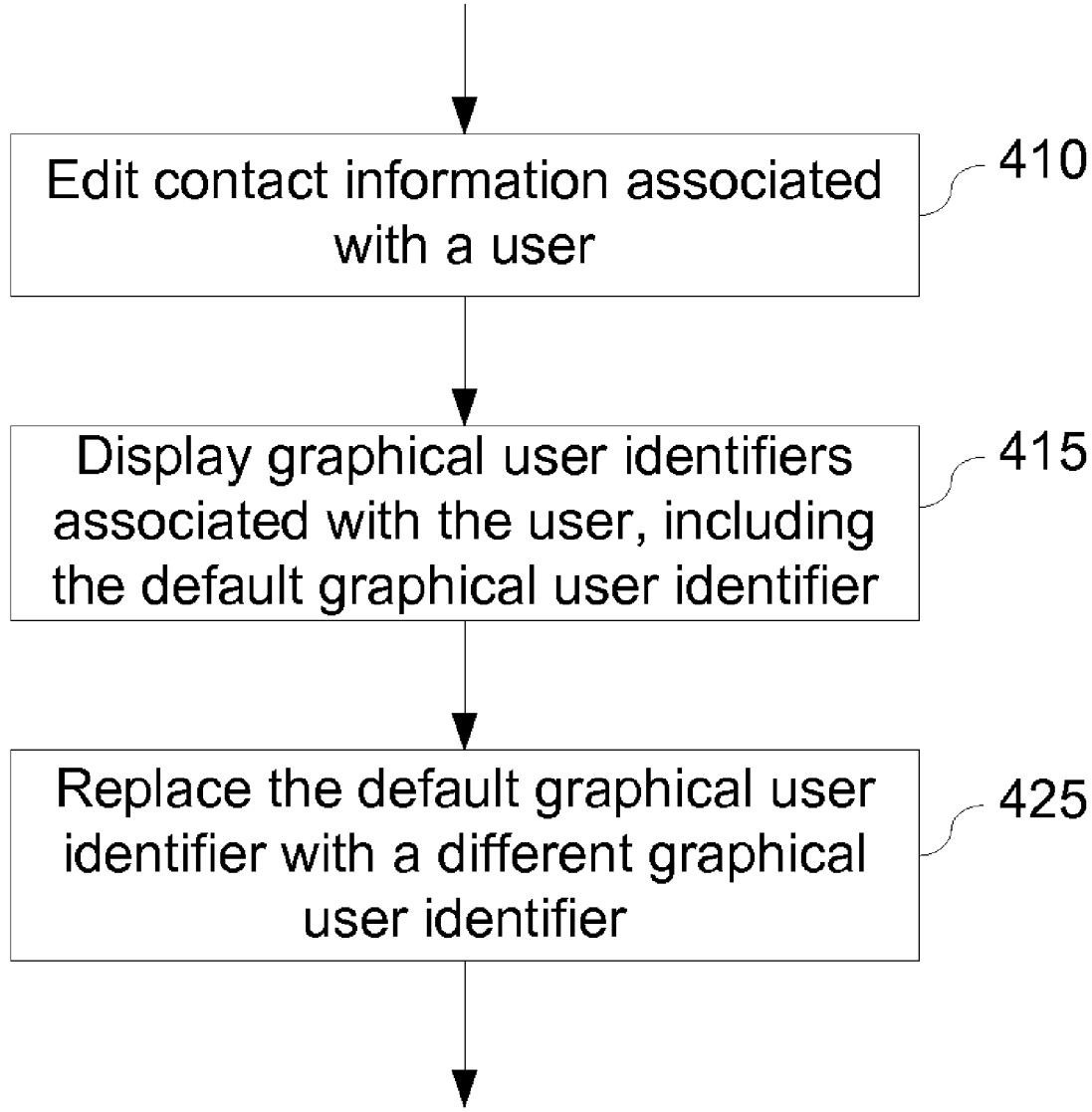
FIG. 4 is a flow diagram of a process of overriding a graphical user identifier with a different one in accordance with some embodiments of the present invention.

There are also alternatives on how to replace the default graphical user identifier with the second user's own choice. As noted above in connection with FIG. 3, the second user may upload a new image into the information service to replace the default one. Similarly, the second user may upload an image from virtually any source, including an RSS or ATOM feed, a website, a social network or the like, a local memory or storage device, or a remotely located memory or storage device to which the second user has access. FIG. 4 is a flow diagram illustrating such a process of overriding the default graphical user identifier with a different one in accordance with some embodiments of the present invention. To do so, the second user first edits the contact information of the first user (410). When the information service 106 extracts the contact information, it also identifies all the graphical user identifiers associated with the first user. All the identified graphical user identifiers are displayed together with other contact information to the second user (415). The second user can then browse these graphical user identifiers and replace the default one with his or her pick (425).

It will be understood by one skilled in the art that the aforementioned schemes of rendering the information items in a display device are exemplary. There are many other rendering schemes that can be used. In most of these, the information items are displayed at a location of application or browser window that is prominent, but consistent with the normal experience that users have with a particular information service.

Figure 5:
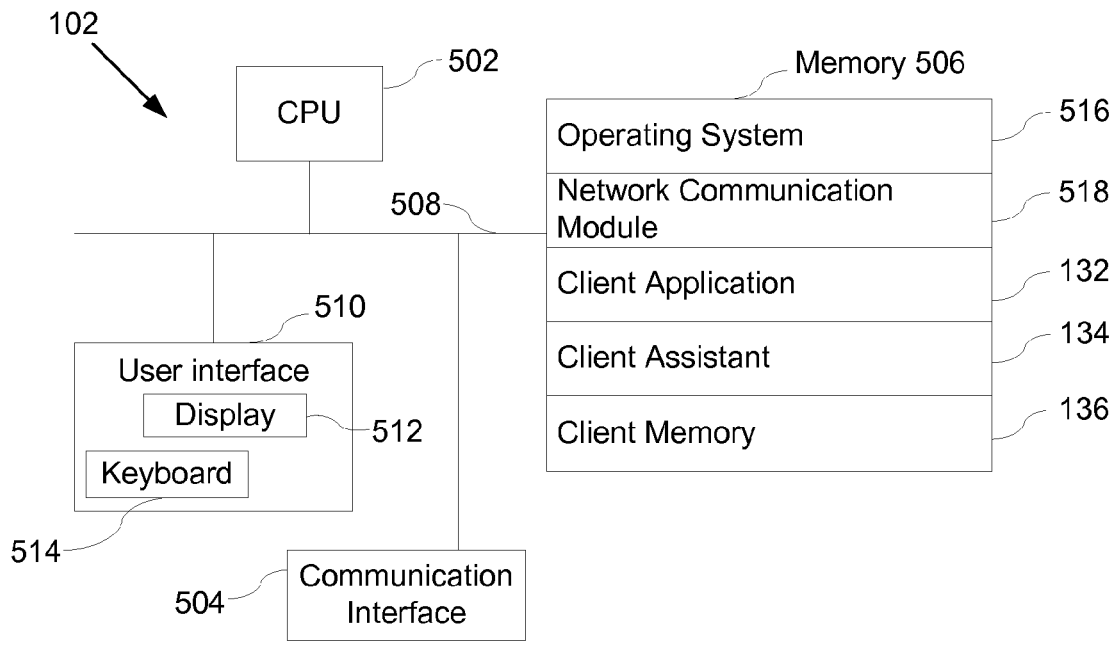
FIG. 5 is a block diagram of an exemplary client in accordance with some embodiments of the present invention.

FIG. 5 is a block diagram illustrating a client 102 in accordance with some embodiments of the present invention. The client 102 typically includes one or more processing units (CPUs) 502, one or more network or other communications interfaces 504, memory 506, and one or more communication buses 508 for interconnecting these components. The client 102 optionally may include a user interface 510 comprising a display device 512 and a keyboard 514. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPU (s) 502. In some embodiments, memory 506 stores the following programs, modules and data structures, or a subset thereof:

- an operating system 516 that includes procedures for handling various basic system services and for performing hardware dependent tasks;
- a network communication module 518 that is used for connecting the client 102 to other computers via the one or more communication network interfaces 504 and one or more communication networks, such as the Internet, other wide area networks, local area networks, metropolitan area networks, and so on;
- a client application 132 that can permit a user to interact with the client 102 as described above;
- a client assistant 134 that can perform one or more tasks as described above; and
- client memory 136 that can optionally include data structures hosting content elements and content element filters, examples of which are described above.

Figure 6:
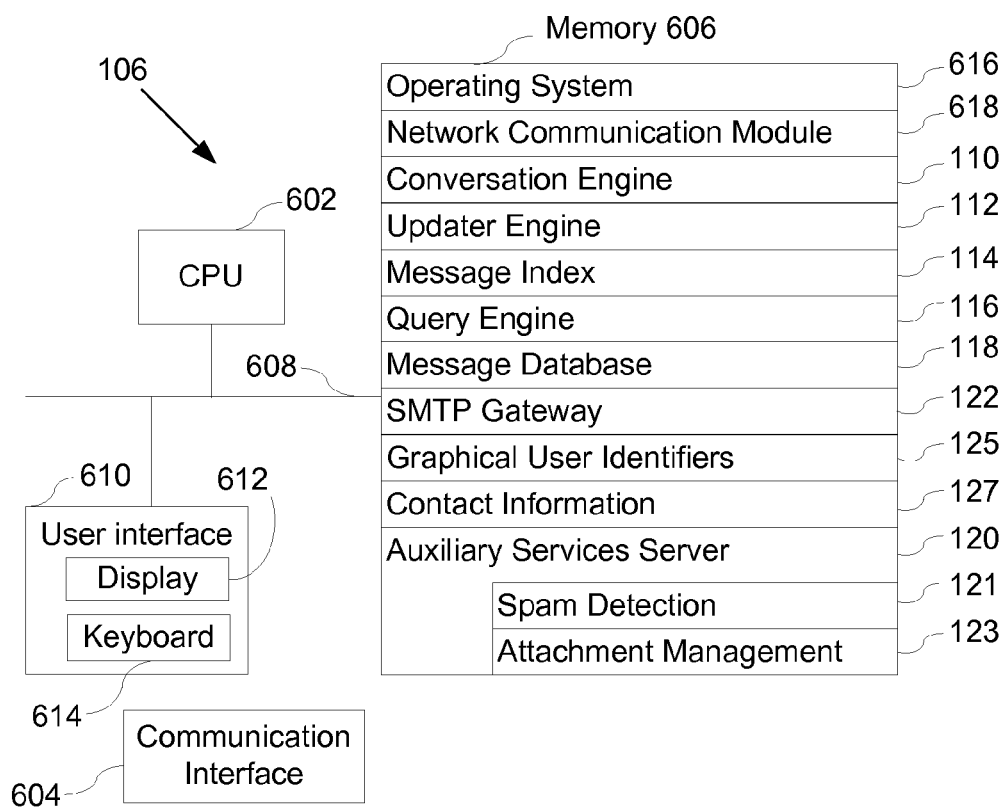
FIG. 6 is a block diagram of an exemplary server in accordance with some embodiments of the present invention.

FIG. 6 is a block diagram illustrating an information service 106 in accordance with some embodiments of the present invention. The information service 106 typically includes one or more processing units (CPUs) 602, one or more network or other communications interfaces 604, memory 606, and one or more communication buses 608 for interconnecting these components. The information service 106 optionally may include a user interface 610 comprising a display device 612 and a keyboard 614. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU (s) 602. In some embodiments, memory 606 stores the following programs, modules and data structures, or a subset thereof:

- an operating system 616 that includes procedures for handling various basic system services and for performing hardware dependent tasks; and
- a network communication module 618 that is used for connecting the information service 106 to other computers via the one or more communication network interfaces 604 and one or more communication networks, such as the Internet, other wide area networks, local area networks, metropolitan area networks, and so on.

In some embodiments, the information service 106 includes the following elements, or a subset or superset of such elements: a conversation engine 110 for responding to a variety of requests from the client assistant 134 and returning responses accordingly; an updater engine 112 for updating a message database 118, a graphical user identifiers database 125 and a contact information database 127; a message index 114 containing index information for messages in the message database 118; a query engine 116 for performing various queries using the message index 114, the graphical user identifiers database 125, the contact information database 127, and message database 118; an SMTP gateway 122 for sending and receiving messages; and an auxiliary services server 120 for performing various auxiliary services.

Illustratively, the auxiliary services 120 may include a spam detection module 121 for detecting and processing spam and an attachment management module 123 for managing the storage and retrieval of documents attached to messages.

Each of the above identified elements in FIGS. 5 and 6 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 506 may store a subset of the modules and data structures identified above. Furthermore, memory 506 may store additional modules and data structures not described above.

Although FIGS. 5 and 6 show respectively a client 102 and an information service 106, the figures are intended more as functional descriptions of the various features which may be present in a client and set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement an information service 106 and how features are allocated among them will vary from one implementation to another, and may depend in part on the amount of data traffic that the system must handle during peak usage periods as well as during average usage periods.

FIGS. 7-16 are exemplary screenshots illustrating the process of a second user suggesting a graphical user identifier to a first user, the first user adopting the graphical user identifiers and displaying the graphical user identifier to a third user under different scenarios in accordance with some embodiments of the present invention.

Figure 7:
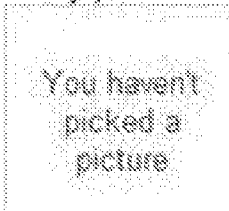
FIG. 7 is an exemplary user interface screenshot of a second user editing a first user's contact information in accordance with some embodiments of the present invention.

FIG. 7 depicts an exemplary user interface for editing, in the contact list or address book of a second user, the contact information of the first user "John Doe". The contact information being edited (by the second user) includes name field 701, email address field 703 and notes field 705. Below notes field 705 is a list of graphical user identifiers associated with the first user. In some embodiments, this list may include only graphical user identifiers selected by the contact, John Doe, and the address book owner (the second user), while in other embodiments the list may optionally include graphical user identifiers selected by other users of the information service as well. In this example, the list includes only one graphical user identifier, picture 707, which is also the current graphical user identifier of the first user. The second user has not chosen any picture yet. To replace the current one with one own pick, the second user uploads a new graphical user identifier by clicking the "upload picture" link 709. The client application, in response, brings up a pop-up window through which the second user selects and uploads the new graphical user identifier into the information service.

Figure 8:
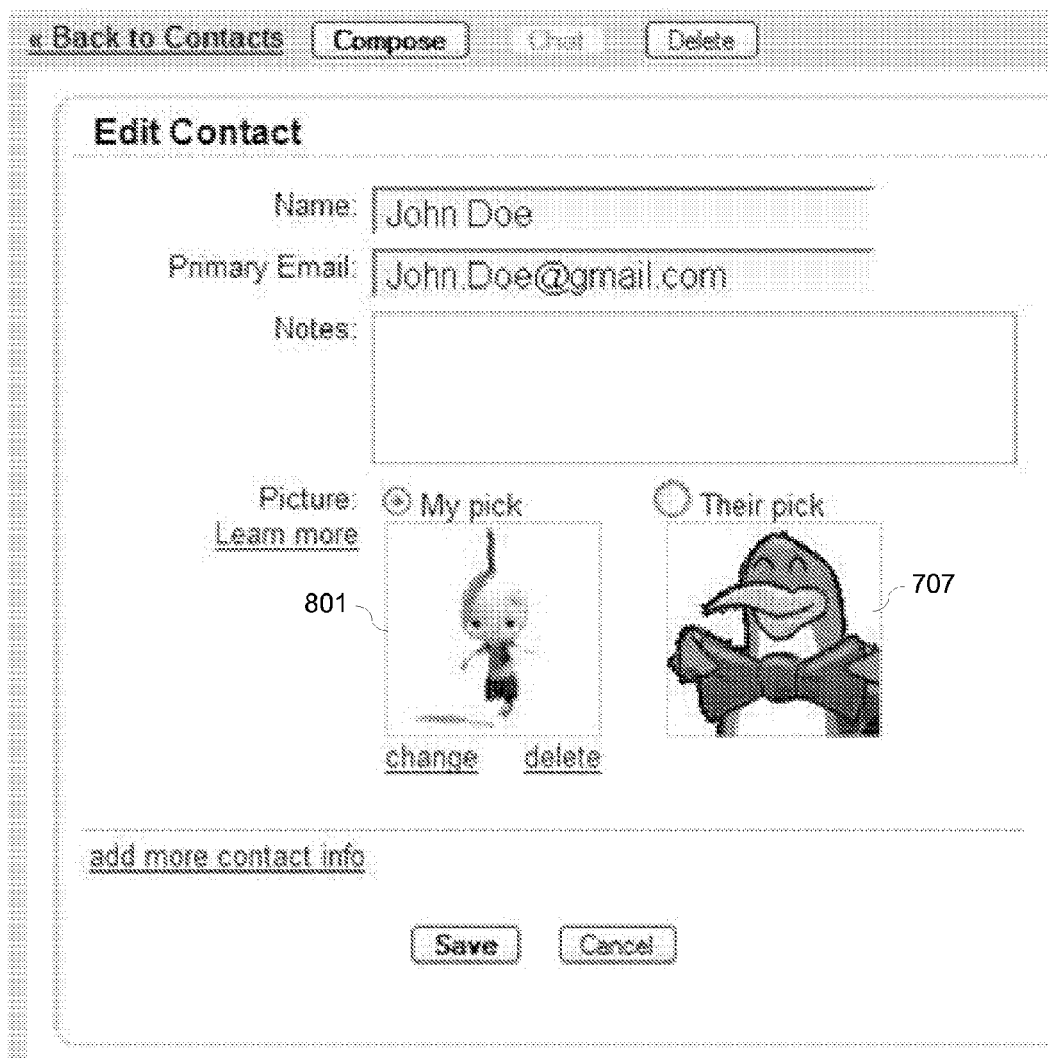
FIG. 8 is an exemplary user interface screenshot of the second user associating a newly uploaded graphical user identifier with the first user in accordance with some embodiments of the present invention.

As depicted in FIG. 8, a new image 801 has been selected by the second user as the current graphical user identifier of the first user. Picture 707 is also listed, making it available for selection by the second user as the graphical user identifier of the first user. "Change" and "delete" buttons under image 801 are links that activate instructions for replacing image 801 with another image, or deleting image 801, respectively. In some embodiments, more than one picture can be listed in the category "their pick." For example, there may be another user who, like the second user, has uploaded a picture of his or her own favorite and associated it with the first user. If so, all the graphical user identifiers associated with the first user will be shown in the category "their pick."

Figure 9:
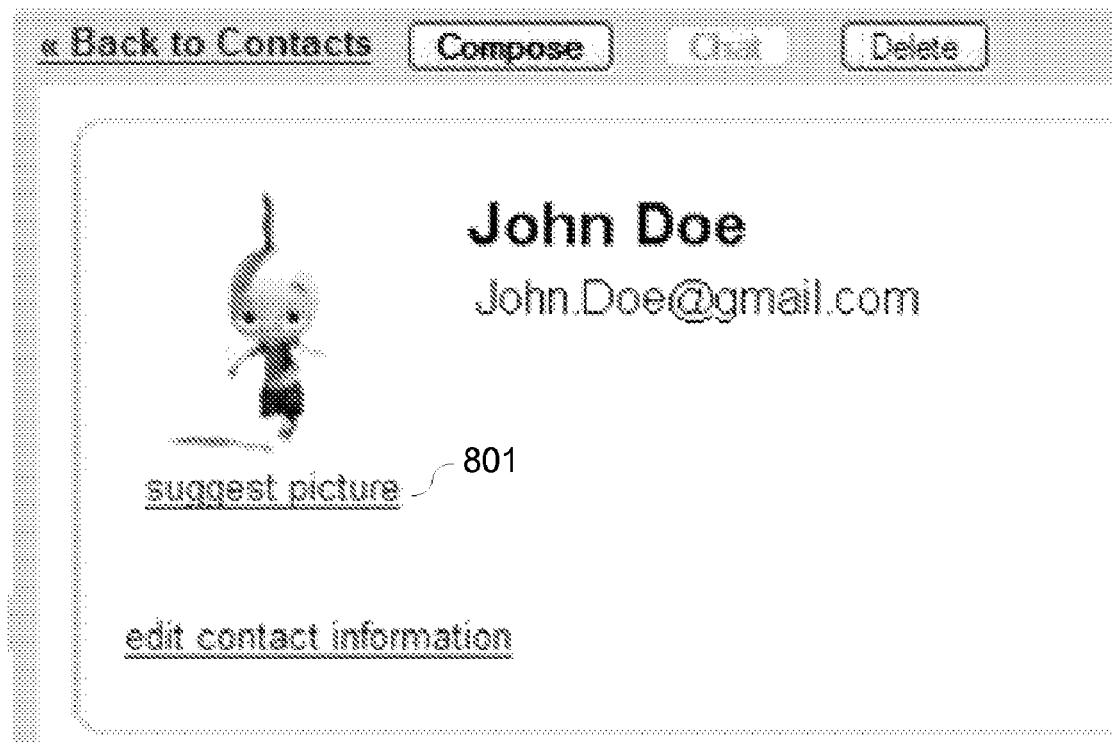
FIG. 9 is an exemplary user interface screenshot of displaying the first user's contact information including the graphical user identifier to the second user in accordance with some embodiments of the present invention.
Figure 10:
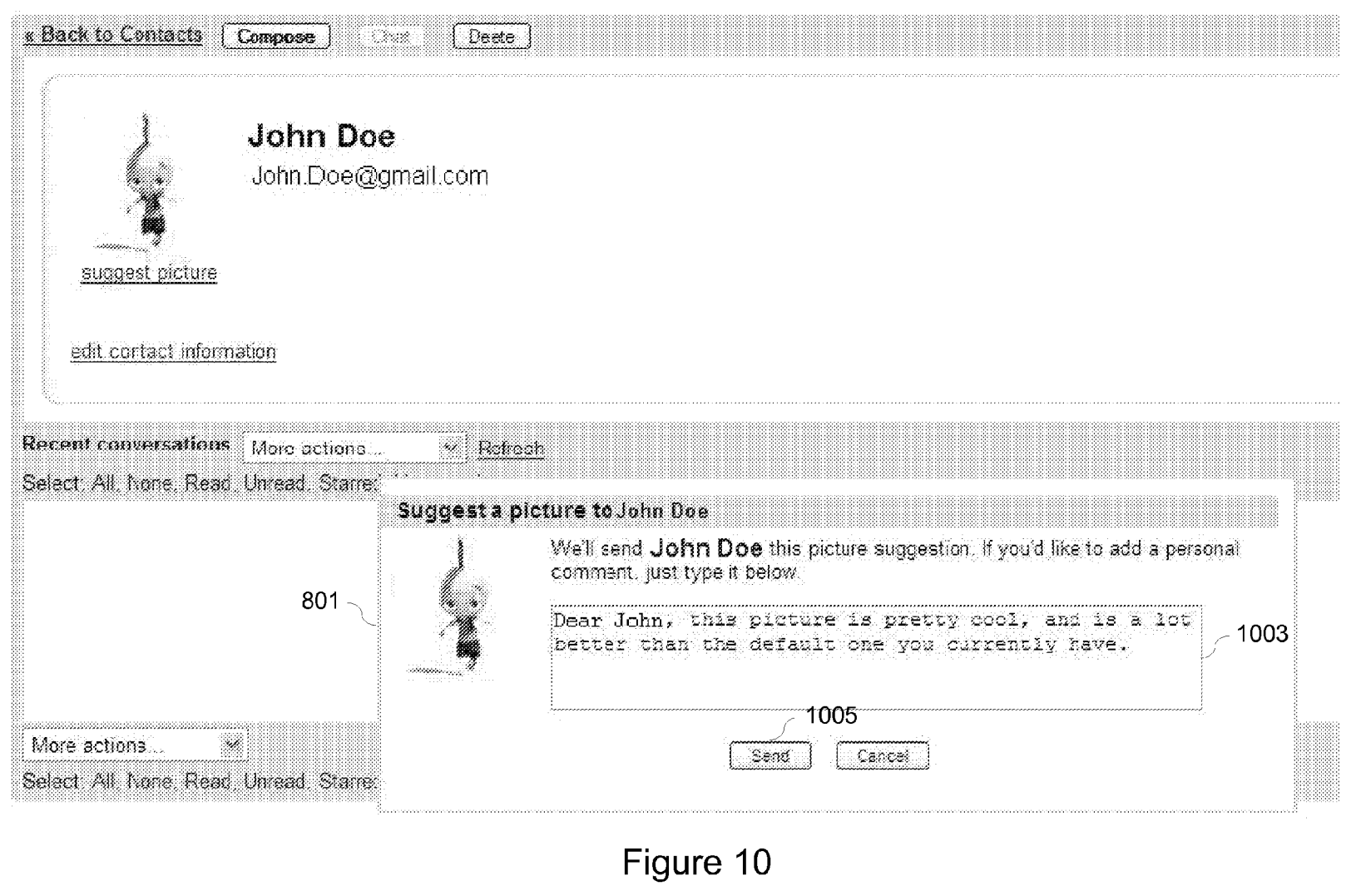

FIG. 9 depicts a screenshot of an exemplary user interface for displaying the first user's contact information after the second user confirms his or her choice. Under the new graphical user identifier is a "suggest picture" link 901. The second user can suggest the picture to the first user by clicking the link 901, which activates instructions (embedded in the user interface and/or in the information service) for transmitting a graphical user identifier suggestion message to the second user. FIG. 10 depicts a pop-up window 1001 that is produced after the second user clicks the "suggest picture" link. The second user can enter a few words in the textbox 1003, promoting or suggesting the new picture to the first user. Finally, the suggest message is sent to the first user after the first user clicks the "Send" button 1005.

Figure 11:
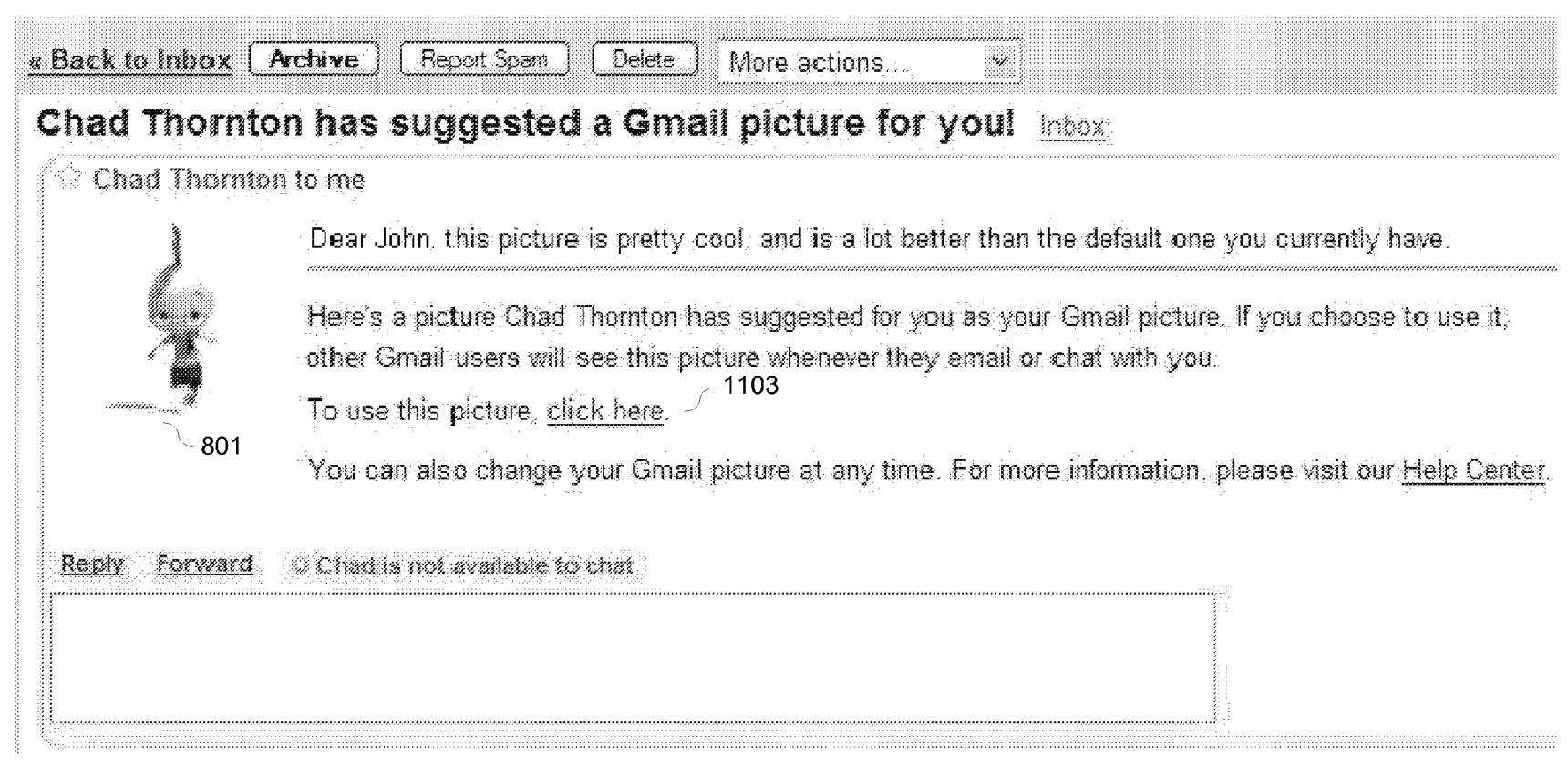

FIG. 11 depicts an exemplary user interface screenshot of the suggest message received by the first user. The message includes picture 801 chosen by the second user and a link 1103. The first user can adopt the picture by clicking the link 1103.

Figure 12:
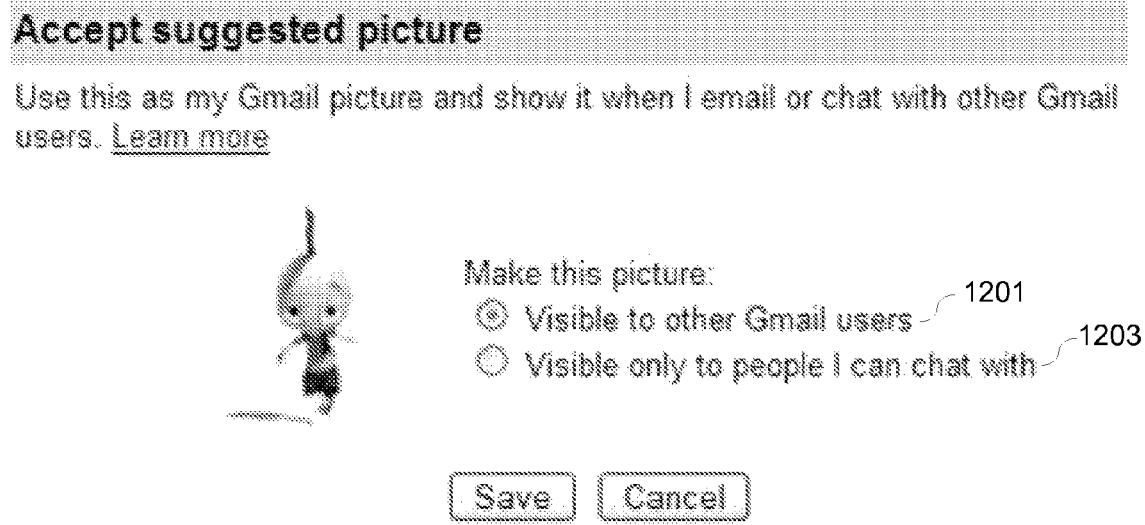
FIG. 12 is an exemplary user interface screenshot of a form that enables the first user to limit the graphical user identifier's visibility to a selected group of users in accordance with some embodiments of the present invention.

After accepting the suggested picture, the first user also has a choice of determining the scope of the new picture's visibility. FIG. 12 is a screenshot illustrating visibility scope options available to the first user. According to the option 1201, the new picture is visible to other users of the information service (which is the Google Gmail project in this example). Another option 1203 limits the new picture visible to only people the first user chats with. Alternatively, although not shown in the figure, the first user may be able to manually select a group of users and limit the picture visible to this selected group of users.

Figure 13:
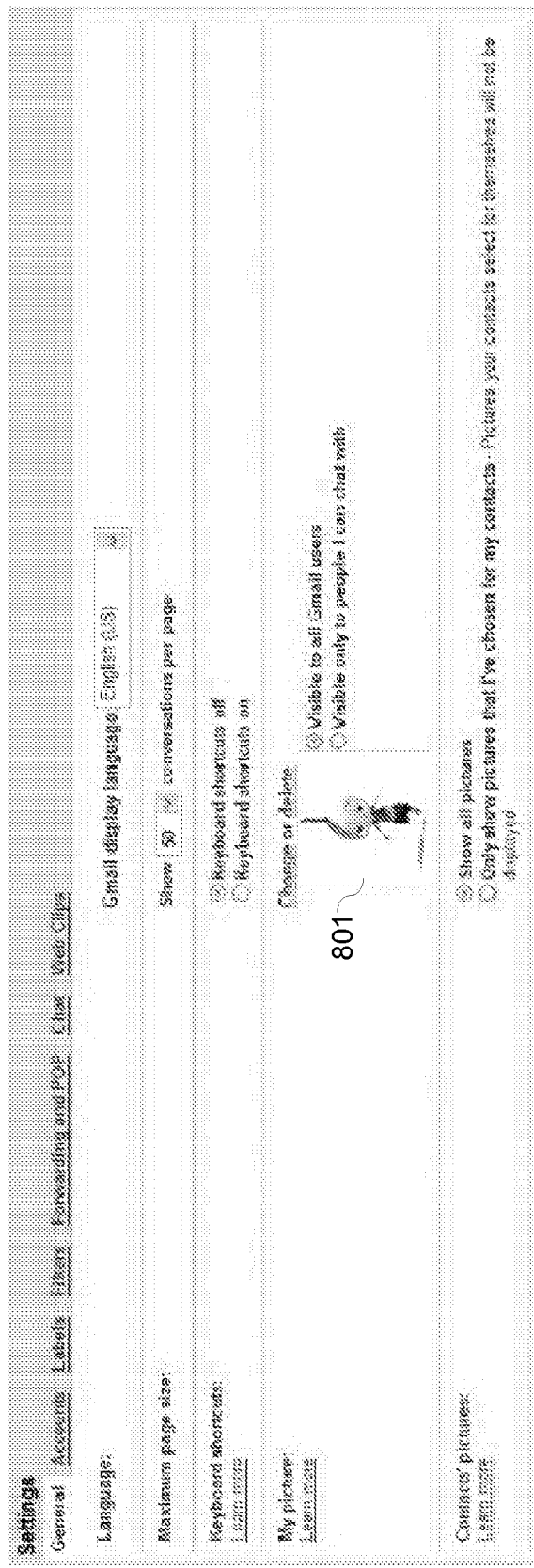
FIG. 13 is an exemplary user interface screenshot of account settings of the first user after the first user adopts the graphical user identifier suggested by the second user in accordance with some embodiments of the present invention.

After selection of the link 1103 and, optionally, selecting the picture's visibility by other users, the user account settings window for the first user includes the first user's selected graphical user identifier (picture 801) as shown FIG. 13. Picture 801 is used as the graphical user identifier of the first user when he communicates with another user of the information service.

In some embodiments, the replacement of the old picture with the new one has an immediate effect on a third user who uses the first user's default graphical user identifier previously. Since the third user has accepted the first user's choice before, it is reasonable to infer that the third user will not object to the first user's new choice. Therefore, when the third user accesses any information item associated with first user, he or she will no longer see the old picture, but the new one just adopted by the first user. The information service implements this feature by updating data entries associated with the first user whenever it detects that the first user just adopts a new graphical user identifier.

Figure 14:
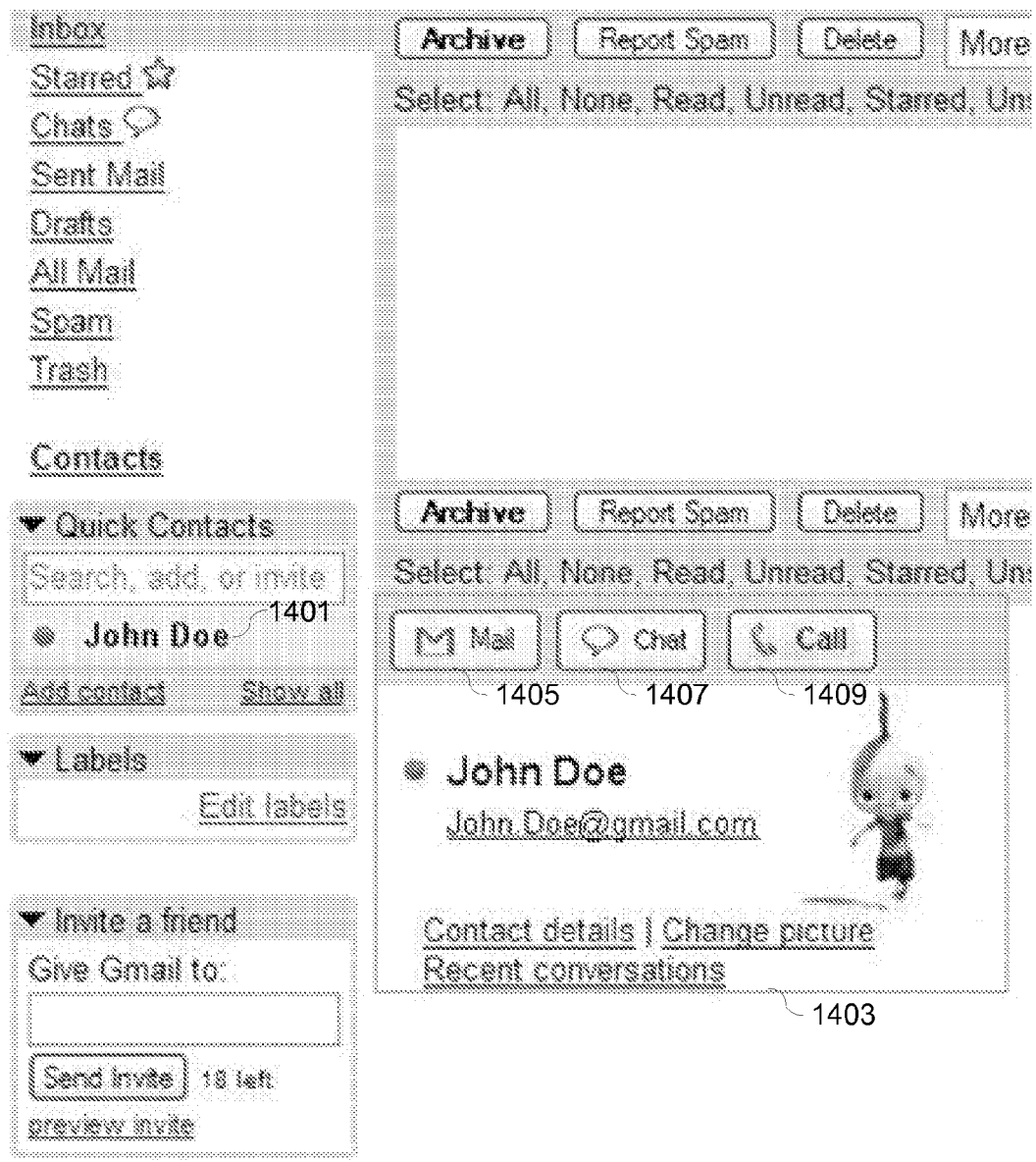
FIG. 14 is an exemplary user interface screenshot of a web mail application, as would be viewed by a third user who has the first user in his or her contact list, displaying the first user's contact information including the graphical user identifier in accordance with some embodiments of the present invention.
Figure 15:
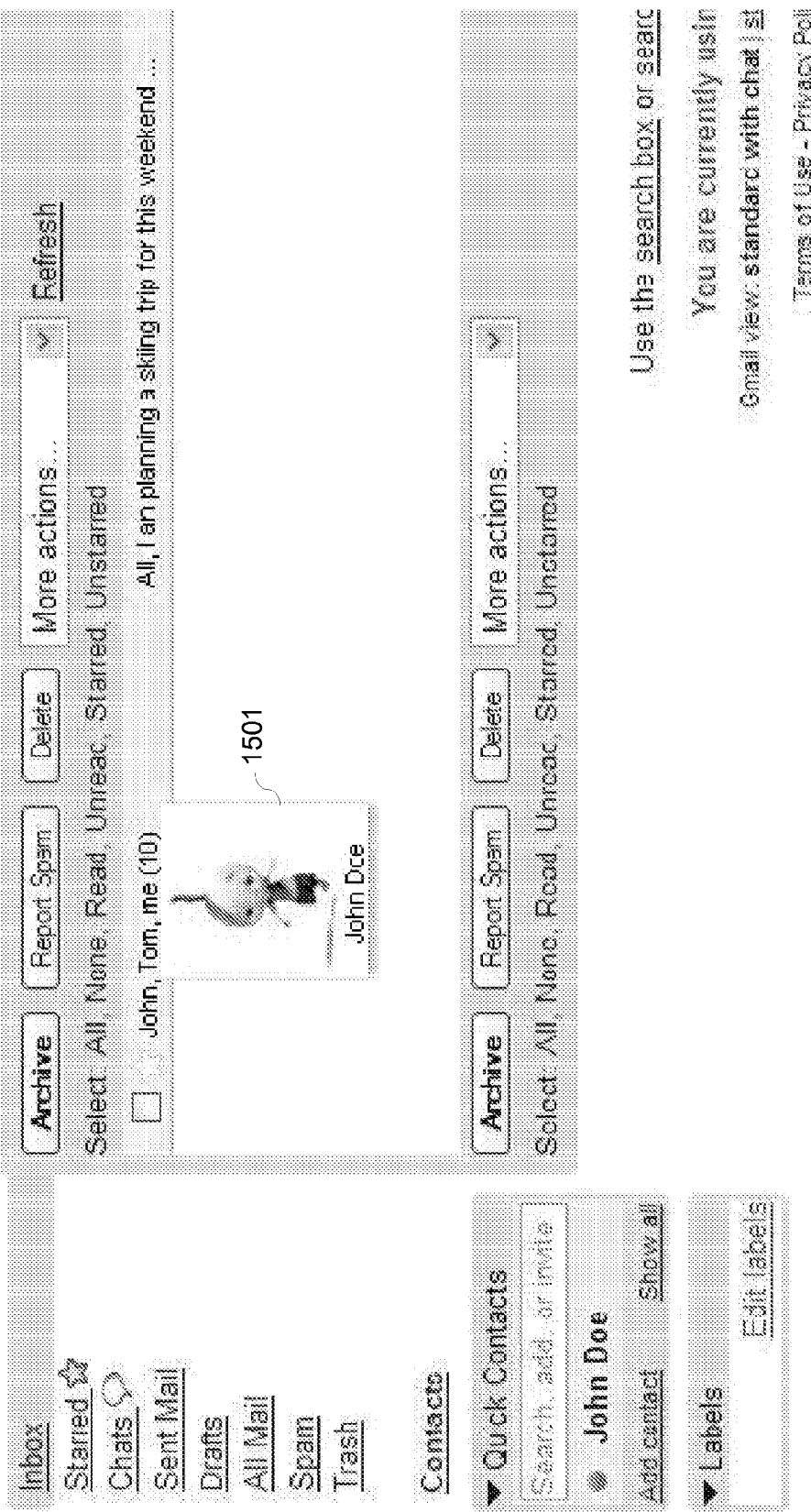
FIG. 15 is an exemplary user interface screenshot of a web mail application, as would be viewed by a third user who has received an email message in which the first user is a participant (e.g., the sender, or another recipient of the message), displaying the first user's graphical user identifier in accordance with some embodiments of the present invention.

FIG. 14 is an exemplary user interface screenshot, for a web based integrated messaging application, illustrating the first user's contact information after the third user moves the mouse cursor within a predefined vicinity of the first user's name 1401 in the third user's contact list. A small window 1403 pops up displaying the first user's contact information, including the new picture adopted by the first user. At the top of the contact information are options available for the third user to communicate with the first user, such as email service 1405, IM chat 1407 and VoIP phone call 1409. In FIG. 15, the third user moves the mouse cursor over the name "John" of the first user who is a participant of an email or IM (or mixed email-IM) conversation. A small window 1501 automatically pops up displaying the new graphical new identifier of the first user. In some embodiments, the small window 1501 automatically disappears after a predetermined period of time (e.g., a few seconds).

If the third user does not like the new graphical user identifier adopted by the first user, he or she can edit the first user's contact information and reject the new picture by expressly selecting another picture. Based on this operation by the third user, the information service no longer automatically pushes a new graphical user identifier chosen by the first user to the third user. In other words, the third user's choice always preempts the first user's own choice of a graphical user identifier for the first user. The first user's new picture is only displayed to those users who have not expressly made their own choice of a graphical user identifier for the first user.

Figure 16:
FIG. 16 is an exemplary user interface screenshot of an instant messaging or chat application, displaying the graphical user identifiers of the first and third users communicating in an on-line chat room in accordance with some embodiments of the present invention.

Finally, FIG. 16 is an exemplary user interface screenshot of an on-line chat room. The chat room has two participants. Each of the two participants has a graphical user identifier, 1601 for "Me" and 1603 for "John Doe." At the top of the chat room are two other options for the two participants to communicate with each other, email service 1605 and VoIP phone call 1607. For example, one participant may like to chat with the other one about a newly downloaded song. Therefore, he or she can send an email message to the other one including the song as an attachment. After the other participant receives the message and listens to the song, they can make real-time comments about the song using the chat room.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of graphically representing users of a messaging system, comprising:
   at a client system having one or more processors and memory:
      associating a particular graphical user identifier with a first user;
      displaying the particular graphical user identifier to a second user in response to user initiated selections by the second user of information items in the messaging system that are associated with the first user;
      in a contact information editing mode, displaying to the second user multiple graphical user identifier candidates distinct from the particular graphical user identifier; and
      in response to a user selection by the second user, replacing the particular graphical user identifier, for display at the client system, with a second user-selected one of the multiple graphical user identifier candidates;
      after the replacing, displaying the second user-selected graphical user identifier to the second user in response to user initiated selections by the second user of information items in the messaging system that are associated with the first user.

2. The method of claim 1, wherein the second user-selected graphical user identifier is selected from the set consisting of a photograph, drawing, video stream, or sequence of images.

3. The method of claim 2, further comprising:
   in the contact information editing mode, allowing the second user to send a message to the first user, the message suggesting to the first user selection of the second user-selected graphical user identifier as the first user's graphical user identifier.

4. The method of claim 1, further comprising:
   displaying the second user-selected graphical user identifier to the second user when the second user moves a cursor into a predefined vicinity of a respective information item associated with the first user; wherein the second user-selected graphical user identifier is selected from the set consisting of a photograph, drawing, video stream, or sequence of images.

5. The method of claim 4, wherein the predefined vicinity is with respect to a textual identifier of the first user, wherein the textual identifier is displayed in a message participants portion of a displayed email message.

6. A method of graphically representing users of a messaging system, comprising:
   at a client system having one or more processors and memory:
      associating a graphical user identifier with a first user;
      associating a display permission, with respect to the graphical user identifier, with a set of second users chosen by the first user in a settings editing mode; and
      sending messages from the first user to a plurality of message addressees, wherein a first subset of the message addressees are members of the set of second users and wherein a second subset of the message addressees are not members of the set of second users;
   wherein display of the graphical user identifier to a first respective message addressee in the first subset, in response to user initiated selection by the first respective message addressee of any of the messages sent from the first user, is enabled; and
   wherein display of the graphical user identifier to a second respective message addressee in the second subset, in response to user initiated selection by the second respective message addressee of any of the messages sent from the first user, is disabled.

7. The method of claim 6, further comprising:
   allowing a respective second user to choose a different graphical user identifier for the first user;
   replacing the graphical user identifier associated with the first user with the different graphical user identifier chosen by the respective second user; and
   enabling display of the different graphical user identifier to the respective second user in response to a user selection by the respective second user of any of the messages sent by the first user to the respective second user.

8. The method of claim 6, further comprising:
displaying the graphical user identifier to a respective second user when the respective second user moves a cursor into a predefined vicinity of a respective information item associated with the first user.

9. The method of claim 8, wherein the predefined vicinity is with respect to a textual identifier of the first user, wherein the textual identifier is displayed in a message participants portion of a displayed email message.

10. A method of graphically representing users of an email system, comprising:
at a client system having one or more processors and memory:
in response to a selection by a second user, replacing in contact information of the second user, a default graphical user identifier of a first user with a second user-selected graphical user identifier; and
after the replacing, displaying the second user-selected graphical user identifier to the second user, in response to user initiated selections by the second user of information items in the email system that are associated with the first user, including displaying the second user-selected graphical user identifier in response to selection of an email message associated with the first user.

11. The method of claim 10, further comprising:
in a contact information editing mode, allowing the second user to send a message to the first user, the message suggesting to the first user selection of the second user-selected graphical user identifier as the first user's graphic user identifier.

12. The method of claim 11, further comprising:
at client system associated with a third user:
displaying the second user-selected graphical user identifier to the third user, in response to user initiated selections by the third user of information items that are associated with the first user, including displaying the second user-selected graphical user identifier in response to selection of an email message associated with the first user;
in the contact information editing mode, displaying to the third user multiple graphical user identifier candidates distinct from the second user-selected graphical user identifier;
in response to a user selection by the third user, replacing the second user-selected graphical user identifier with a user-selected graphical user identifier chosen by the third user; and
after the replacing, displaying to the respective third user the user selected graphical user identifier, in response to user initiated selections by the respective third user of information items in the email system that are associated with the first user.

13. The method of claim 10, further comprising:
displaying the second user-selected graphical user identifier to the second user when the second user moves a cursor into a predefined vicinity of a respective information item associated with the first user.

14. The method of claim 13, wherein the predefined vicinity is with respect to a textual identifier of the first user, wherein the textual identifier is displayed in a message participant's portion of a displayed email message.

15. A computer system, comprising:
a main memory;
a processor; and
at least one program, stored in the main memory and executed by the processor, the at least one program further including:
instructions for responding to a selection by a second user by replacing, in contact information of the second user, a default graphical user identifier of a first user with a second user-selected graphical user identifier;
instructions for displaying the second user-selected graphical user identifier to the second user, in response to user initiated selections by the second user of information items that are associated with the first user, including instructions for displaying the second user-selected graphical user identifier in response to selection of an email message associated with the first user.

16. The computer system of claim 15, wherein the displaying instructions further comprise:
instructions for displaying the second user-selected graphical user identifier to the second user when the second user moves a cursor into a predefined vicinity of a respective information item associated with the first user.

17. The computer system of claim 16, wherein the predefined vicinity is with respect to a textual identifier of the first user, wherein the textual identifier is displayed in a message participants portion of a displayed email message that is associated with the first user.

18. The computer system of claim 15, wherein the instructions further comprise:
instructions, for use in a contact information editing mode, for allowing the second user to send a message to the first user, the message suggesting selection of the second user-selected graphical user identifier to the first user.

19. The computer system of claim 18, further comprising:
instructions for displaying the second user-selected graphical user identifier to a third user, in response to user initiated selections by the third user of information items that are associated with the first user, including instructions for displaying the second user-selected graphical user identifier in response to selection of an email message associated with the first user;
instructions, for use in the contact information editing mode, for displaying to the third user multiple graphical user identifier candidates distinct from the second user-selected graphical user identifier; and
instructions, for use in the contact information editing mode, for replacing the second user-selected graphical user identifier with a user-selected graphical user identifier chosen by the third user; and
instructions for, after the replacing, displaying the user-selected graphical user identifier to the third user in response to user initiated selections by the third user of information items in the messaging system that are associated with the first user.

20. A computer program product for use in conjunction with a computer system, the computer program product comprising a computer readable storage medium and a computer program mechanism embedded therein, the computer program mechanism comprising:
instructions for replacing in contact information of the second user, in response to a selection by a second user, a default graphical user identifier of a first user with a second user-selected graphical user identifier;
instructions for displaying the second user-selected graphical user identifier to the second user, in response to user initiated selections by the second user of information items that are associated with the first user, including instructions for displaying the second user-selected graphical user identifier in response to selection of an email message associated with the first user.

21. The computer program product of claim 20, wherein the displaying instructions further comprise:

instructions for displaying the second user-selected graphical user identifier to the second user when the second user moves a cursor into a predefined vicinity of a respective information item associated with the first user.

22. The computer program product of claim 21, wherein the predefined vicinity is with respect to a textual identifier of the first user, wherein the textual identifier is displayed in a message participants portion of a displayed email message that is associated with the first user.

23. The computer program product of claim 20, wherein the suggest instructions further comprise:

instructions, for use in a contact information editing mode, for allowing the second user to send a message to the first user, the message suggesting selection of the graphical user identifier to the first user.

24. The computer program product of claim 23, further comprising:

instructions for displaying the second user-selected graphical user identifier to a third user, in response to user initiated selections by the third user of information items that are associated with the first user, including instructions for displaying the second user-selected graphical user identifier in response to selection of an email message associated with the first user;

instructions, for use in the contact information editing mode, for displaying to the third user multiple graphical user identifier candidates distinct from the second user-selected graphical user identifier; and instructions, for use in the contact information editing mode, for replacing the second user-selected graphical user identifier with a user-selected graphical user identifier chosen by the third user; and instructions for, after the replacing, displaying the user-selected graphical user identifier to the third user in response to user initiated selections by the third user of information items in the messaging system that are associated with the first user.

25. A computer system comprising:

means for replacing, in contact information of the second user, in response to a selection by a second user, a default graphical user identifier of a first user with a second user-selected graphical user identifier;

means for displaying the second user-selected graphical user identifier to the second user, in response to user initiated selections by the second user of information items that are associated with the first user, including means for displaying the second user-selected graphical user identifier in response to selection of an email message associated with the first user.

* * * * *